Nov. 5, 1940.                O. BORSARELLI                2,220,639
                      GLASS FOR MOTOR VEHICLE LIGHTS
                           Filed Feb. 11, 1938

INVENTOR
OTTAVIE BORSARELLI
By Young, Emery & Thompson
ATTYS.

Patented Nov. 5, 1940

2,220,639

UNITED STATES PATENT OFFICE 2,220,639

GLASS FOR MOTOR VEHICLE LIGHTS

Ottavio Borsarelli, Turin, Italy

Application February 11, 1938, Serial No. 190,108
In Italy February 18, 1937

1 Claim. (Cl. 240—106)

This invention relates to signalling lights for vehicles, and more particularly to a lenticular distribution of light suitable for motor vehicle tail lights, especially tail lights combined with reflex reflectors.

The glasses combined with a reflex reflecting surface, presently in use on vehicle lights, are constituted by a plate comprising a circular reflecting rim and a central plano-convex lens, usually referred to as "bull's eye." The bull's eye alone diffuses the light of the lamp and the glass must therefore be very wide in order to meet the optical requirements. In fact, the reflecting portion must have an area of at least 20 square centimeters and the transparent portion cannot obviously be of a smaller area, if the prescribed light beam must be obtained. The result is that the device is very clumsy, expensive and not always easy to fit on the vehicle.

The object of this invention is to eliminate the above mentioned drawback, by providing a glass which is of a smaller size than those presently in use through maintaining the same efficiency.

According to this invention, the dioptrical surface of the autocollimating elements surrounding the central bull's eye have a relatively small angular width sufficient for the purposes for which the vehicle light is adapted and the autocollimating elements lie side by side in such manner as to avoid restricted passages for the light rays from one element to another through the glass. The central bull's eye is constituted by a meniscus, the radius of curvature and thickness of which are so chosen as to strongly deflect a part of the incident rays from the lamp, so that said part of the rays is distributed on the circular autocollimating zone and issues from the dioptric surface of said zone illuminating this latter in a uniform manner.

With this arrangement it is possible to reduce the diameter of the central eye and to enlarge the reflecting surface, without reducing the size of the light beam; further, it is possible to construct vehicle lights of reduced size embodying beside the transparent portion and reflex reflector also the compulsory stop light.

According to a modification, the central lenticular porti ' may be constituted by the combination of an outer convex lens and an inner dioptric system formed by a torus-shaped meniscus. This arrangement has been found very efficient in practice for, besides affording a luminous zone of considerable width and a satisfactory distribution of the light beam in the central portion, it has the advantage of reflecting also a certain quantity of rays falling on the outer eye surface. This is due to the fact that the torus-shaped meniscus generates in the central portion a curved cone which acts like a prism, and reflects the rays falling thereon perpendicularly and within a certain angle.

The accompanying drawing shows, by way of example, some constructions of the glass for vehicle lights according to this invention.

Figure 1:
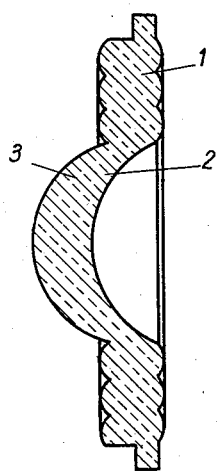
Figure 1 is a section showing a glass in which the eye is constituted by a concavo-convex lens.

Referring to the drawing, the plate constituting the glass for the vehicle light comprises a peripheral reflex reflecting portion 1 and a central transparent portion constituting the eye through which the light from the lamp is diffused to the outside. The inside surface of said portion is formed in such manner as to deflect a portion of the rays towards the reflecting portion, causing them to emerge from the dioptric surface of said portion.

In Figure 1, the reflex reflector is constituted by a concavo-convex lens 2; as will be easily seen, the marginal portion of the inside surface 3 of the eye is arranged, with respect to the reflex reflector and the source of light, in such manner that a part of the rays pass obliquely through the reflex reflecting layer issuing from the lantern to the outside. In this manner, the whole surface of the plate is utilized for diffusing the light instead of the portion 1 only as in known constructions with a central bull's eye.

As the figure clearly shows, the autocollimating elements have dioptric surfaces of limited width and are arranged side by side so that the ratio between the thickness of the plate in the optical axis of the autocollimating elements and the thickness of the plate between said elements is very near unity. Narrower passages in the thickness of the plate between an autocollimating element and the adjacent ones is avoided. The deflected light rays may therefore extend radially into the thickness of the plate and issue uniformly from all dioptric surfaces of the autocollimating elements, including the farthest ones from the central bull's eye.

Figure 2:
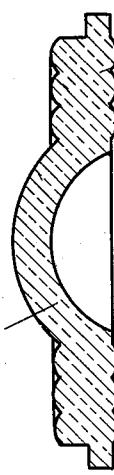
Figure 2 is a diametral section showing a glass with an eye formed by a meniscus.
Figure 3:
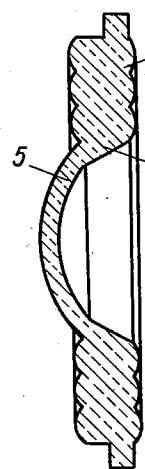
Figure 3 is a sectional view of a glass with an eye constituted by the combination of a meniscus and frustum.

In Figure 2 the central portion is constituted by a meniscus 4 which affords a greater distribution of light in the reflex reflector 1. It is possible to further improve this diffusion by employing the arrangement shown in Figure 3, in which the central portion comprises a meniscus 5 and a portion having an inner frustum-shaped surface 6.

Figure 4:
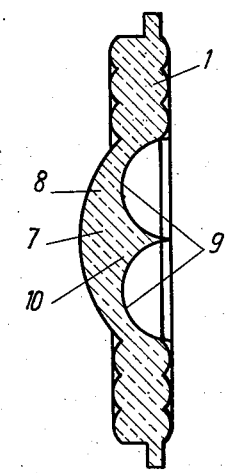
Figure 4 is a sectional view of a glass with an eye constituted by the combination of a convex lens and a torus-shaped meniscus.

A still higher efficiency may be obtained with the construction shown in Figure 4, in which the central portion 7 is constituted by the combination of an outer convex surface 8 and an inner surface 9 constituted by a torus-shaped meniscus which, besides affording an improved light distribution, has the advantage of reflecting in part the rays on to the outer surface 8 through the presence of the point 10 having a curved surface, which acts as a prism.

Figure 5:
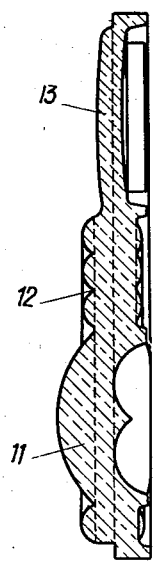
Figure 5 is a sectional view showing a cataphote plate combined with the stop light and having an eccentric eye.
Figure 6:
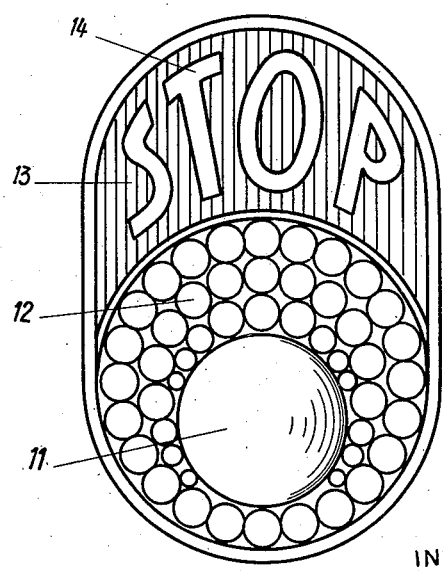
Figure 6 is a front elevation.

Figures 5 and 6 show a construction of a reflex reflector plate combined with the stop light and tail light of a vehicle.

The plate comprises a transparent section 11, for instance of the type shown in Figure 4, arranged eccentrically with respect to the reflex reflector section 12, in order to improve the illumination of the plate, and an expansion 13 opposed, with respect to the center, to the section 11 and carrying the stop light 14.

In the examples shown and described, the diffusing surfaces are constituted by spherical and torus-shaped sections; it will be understood, however, that they may be constituted by sections of a linear lenticular or any other suitable form and that the form and constructional details may be varied according to practical requirements without departing from the scope of this invention.

What I claim is:

A glass for a vehicle light having a lamp, said glass comprising a peripheral section constituted by autocollimating elements each having a dioptric surface of small angular width and arranged side by side, in such manner as to avoid narrow light transmitting passages in the thickness of the glass between an autocollimating element and the adjacent ones, and a central bull's eye having a convex outer surface and a torus-shaped concave inner surface adapted to deflect a part of the light rays issuing from the lamp in a substantially radial direction from the bull's eye into said peripheral portion to cause them to issue uniformly distributed from the dioptric surfaces of said peripheral portion.

OTTAVIO BORSARELLI.